1,694,527

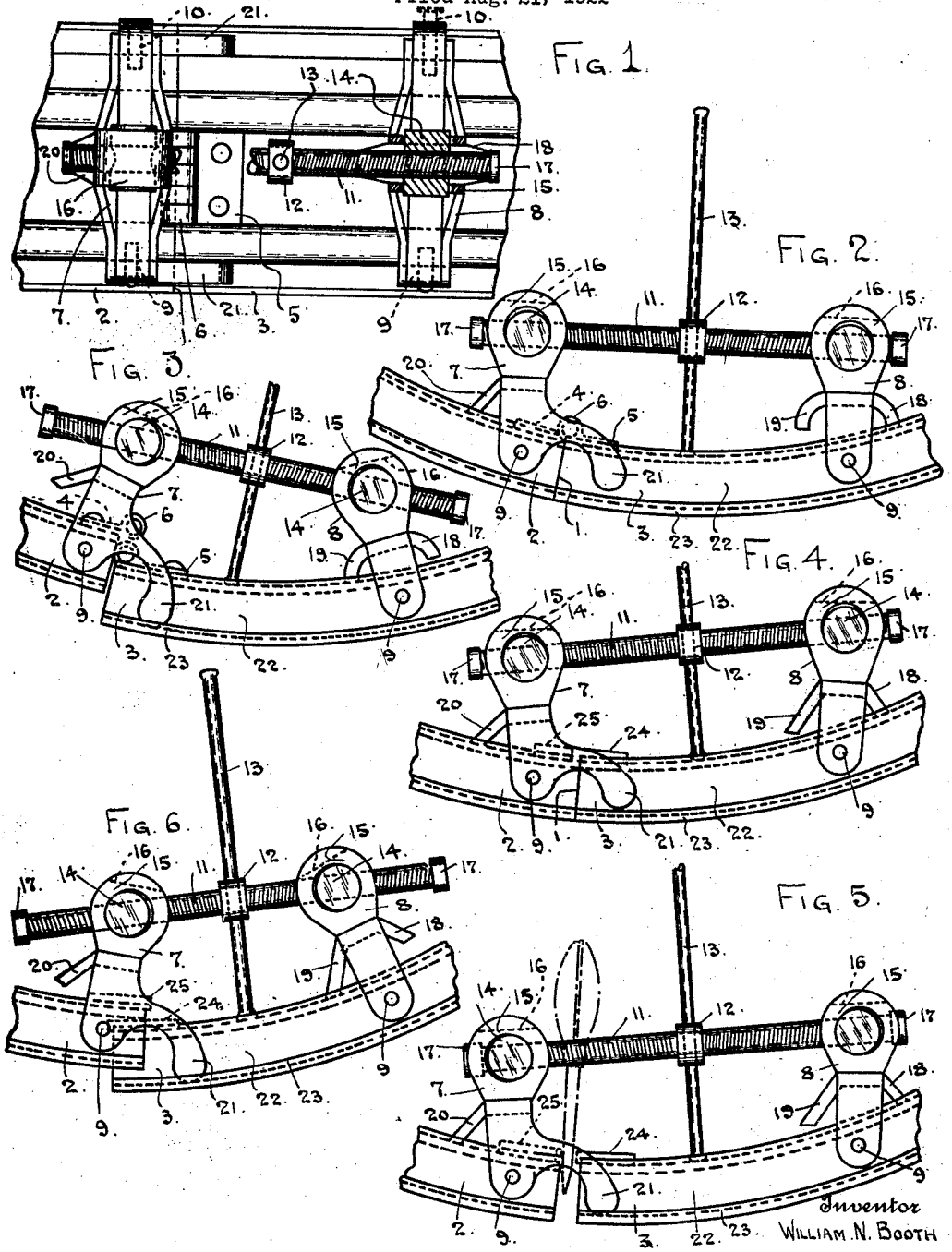
Dec. 11, 1928.
W. N. BOOTH
DEMOUNTABLE RIM TOOL
Filed Aug. 21, 1922
1,694,527
Inventor
WILLIAM N. BOOTH Patented Dec. 11, 1928.

UNITED STATES PATENT OFFICE.

WILLIAM N. BOOTH, OF DETROIT, MICHIGAN.

DEMOUNTABLE-RIM TOOL.

Application filed August 21, 1922. Serial No. 583,333.

The invention relates to tools for contracting and expanding rims particularly of the demountable type and has for its object the provision of a tool of but few parts which may be readily attached to a transversely split rim to separate the ends of the rim and to contract the rim sufficiently to apply or remove a tire. With this and other objects in view, the invention resides in the novel features of construction as more fully hereinafter set forth.

In the drawings:

Figure 1 is a plan view of a portion of a demountable rim having cooperating hinge members at its split, with the tool applied, this tool being shown partly in section;

Figure 2 is a side elevation thereof;

Figure 3 is a side elevation thereof showing the parts in different adjusted positions;

Figures 4, 5 and 6 are side elevations of a portion of a demountable rim having overlapping plates at its split, with the tool applied and showing the parts in different adjusted positions.

As shown in Figures 1, 2 and 3, the demountable rim is transversely split at 1 to form the two abutting end portions 2 and 3 to which are secured cooperating hinge members 4 and 5 respectively having registering barrel portions 6 adapted to receive a pin.

The rim tool has the yokes 7 and 8 which respectively embrace the rim end portions 2 and 3 and are secured thereto by means of the fixed pins 9 in one of the bifurcations and the slidable headed pins 10 in the other of the bifurcations, these pins being engageable in transversely aligned apertures in the side flanges of the end portions of the rim. 11 is a rod having right and left threaded end portions and an intermediate enlargement 12 through which slidably extends the transverse rod 13. The threaded end portions of the rod 11 threadedly engage the cylindrical nuts 14 journalled in the bifurcations 15 extending outwardly from the bases of the yokes 7 and 8. Integral top bars 16 are preferably provided extending between the ends of the bifurcations 15 to reinforce the same and the rod 11 also preferably has the enlargements 17 at its ends to prevent accidental disengagement of the rod from the nuts.

The yoke 8 has the diverging lugs 18 and 19 inclined outwardly and inwardly and extending toward the end portion 3 of the rim and adapted to alternatively engage its base to limit the rotation of the yoke about its pins 9 and 10 relative to the end portion 3. The yoke 7 has the outwardly inclined lug 20 extending toward the end portion 2 of the rim and engageable with the base of this end portion to limit the rotation of the yoke abut its pins 9 and 10 respectively to the rim end portion. The yoke 7 also has the inwardly extending substantially parallel lugs 21 upon its main bifurcations and engageable with the side flanges 22 of the rim end portion 3 whereby the side flanges of both rim end portions 2 and 3 are maintained in alignment and are prevented from moving laterally relative to each other during their relative radial movements while being separated. The ends of the lugs 21 are constructed to engage the inner peripheries of the beads 23 at the outer edges of the side flanges 22 upon rotation of the yoke 7 relative to its rim end portion 2 and toward the yoke 8, these lugs acting as fulcrums for moving the rim end portion 2 radially inward relative to the rim end portion 3 as shown particularly in Figure 3.

In operation, the tool is applied to the demountable rim with the yoke 7 adjacent the split in the rim, these yokes being secured to the rim by the pins 9 and 10. The rod 11 having right and left threaded portions is rotated to move the yokes toward each other when the lug 19 upon the yoke 8 engages the base of the rim end portion 3 and prevents further rotation of this yoke relative to the rim end portion, and the ends of the lugs 21 engage the inner peripheries of the beads 23 of the rim end portion 3. Continued rotation of the threaded rod 11 moves the rim end portion 2 radially inward relative to the rim end portion 3, the yoke 7 fulcruming about the portions of the beads 23 engaged by the ends of the lugs 21. When the rim end portion 2 has moved radially inward sufficient so its base clears the barrel portion 6 of the hinge member 5, the rim end portion 2 then slides over the rim end portion 3 until the rim has been contracted sufficiently to permit of applying or removing a tire. To return the rim end portions of the rim to their original positions, the threaded rod 11 is rotated in the opposite direction, at which time the lug 18 of the yoke 8 comes into engagement with the base of the rim end portion 3 and the lug 20 of the yoke 7 comes into engagement with the base of the rim end portion 2, thereby preventing any further rotative movement of the yokes 8 and 7 respectively relative to their rim end portions. Continued rotation of the threaded rod 11 in this direction will then move the rim end portion 2 over the rim end portion 3 until it snaps into place. The rim tool can then be removed from the rim by drawing the pins 10 outwardly to disengage them from the side flanges of the rim end portions.

As shown in Figures 4, 5 and 6, the rim is of that type having cooperating plates 24 and 25 adjacent its split, each having an inner end portion which slightly overlaps the base of the rim end portion to which the other plate is secured. The rim tool is of the same construction as that shown in Figures 1, 2 and 3.

In operation, this rim tool is applied to the demountable rim with the yoke 7 adjacent the transverse split of the demountable rim and the threaded rod 11 is rotated to move the yokes away from each other when the lug 18 upon the yoke 8 and the lug 20 upon the yoke 7 engage the bases of the rim end portions and prevent further rotation of these yokes relative to their respective rim end portions. Continued rotation of the threaded rod then separates the ends of the rim sufficiently to clear the overlapping plates 24 and 25, at which time a suitable tool such as a screw driver may be inserted between the rim ends to hold the same in this separated relation. Then the threaded rod of the tool is rotated in the reverse direction to move the yokes toward each other. The yoke 8 is rotated relative to the rim end portion to which it is secured until its lug 19 engages the base of this rim end portion. The yoke 7 is rotated relative to the rim end portion to which it is secured until the ends of its lugs 21 engage the inner peripheries of the beads upon the rim end portion to which the yoke 8 is secured. Continued rotation of the threaded rod swings the rim end portion to which the yoke 7 is secured radially inward relative to the rim end portion to which the yoke 8 is secured and then moves these rim end portions over each other until the rim has been contracted sufficiently to apply or remove a tire. The screw driver may be removed after the rim end portions have begun their telescopic movement. The rim may be returned to its normal position by next rotating the threaded rod of the tool in a reverse direction.

What I claim as my invention is:

1. In a rim tool for a transversely split rim having a side flange, the combination with a member secured to one end of the rim, of a member connected to the other end of the rim and having a lug arranged to extend at the side of and fulcrum upon the side flange at the first mentioned end of the rim, and means for moving said members toward each other.

2. In a rim tool for transversely split rim having a beaded side flange, the combination with a member secured to one end of the rim and having a lug arranged to engage the side flange and fulcrum upon its bead at the other end of the rim, a second member secured to the last-mentioned end of the rim, and means for moving said members toward each other.

3. In a rim tool for a transversely split rim, the combination with a member secured to one end of the rim, of a member connected to the other end of the rim, a common means upon said last-mentioned member engageable with the first-mentioned rim end for moving the rim ends radially relative to each other and for maintaining the rim ends in alignment, and means for moving said members relative to each other.

4. In a rim tool for a transversely split rim having a beaded side flange, the combination with a member secured to one end of the rim, of a second member connected to the other end of the rim, means upon said second member engageable with the bead upon the side flange of the first-mentioned rim end for moving the second-mentioned rim end radially relative to the first-mentioned rim end, and means for moving said members toward each other.

5. In a rim tool for a transversely split rim having side flanges with beads at their outer edges, the combination with a yoke detachably secured to one of the rim ends, of a second yoke detachably secured to the other of the rim ends, lugs upon said second yoke at the sides of the side flanges and engageable with the beads upon said first-mentioned rim end to fulcrum thereabout, means upon the rim for positioning said second yoke so that its lugs will engage the beads upon said first-mentioned rim end, and a threaded rod operatively connected to said yokes to move the same toward each other.

6. In a rim tool for a transversely split rim having a side flange provided with a transverse bearing surface at one end of the rim, the combination with a member secured to the other end of the rim and having a lug arranged to fulcrum upon said bearing surface, whereby said rim ends are moved radially relative to each other upon swinging of said member.

In testimony whereof I affix my signature.

WILLIAM N. BOOTH.